(No Model.) 2 Sheets—Sheet 1.
G. B. LAWRASON.
INSTRUMENT FOR MEASURING AND REGULATING ELECTRICAL RESISTANCES.
No. 514,325. Patented Feb. 6, 1894.
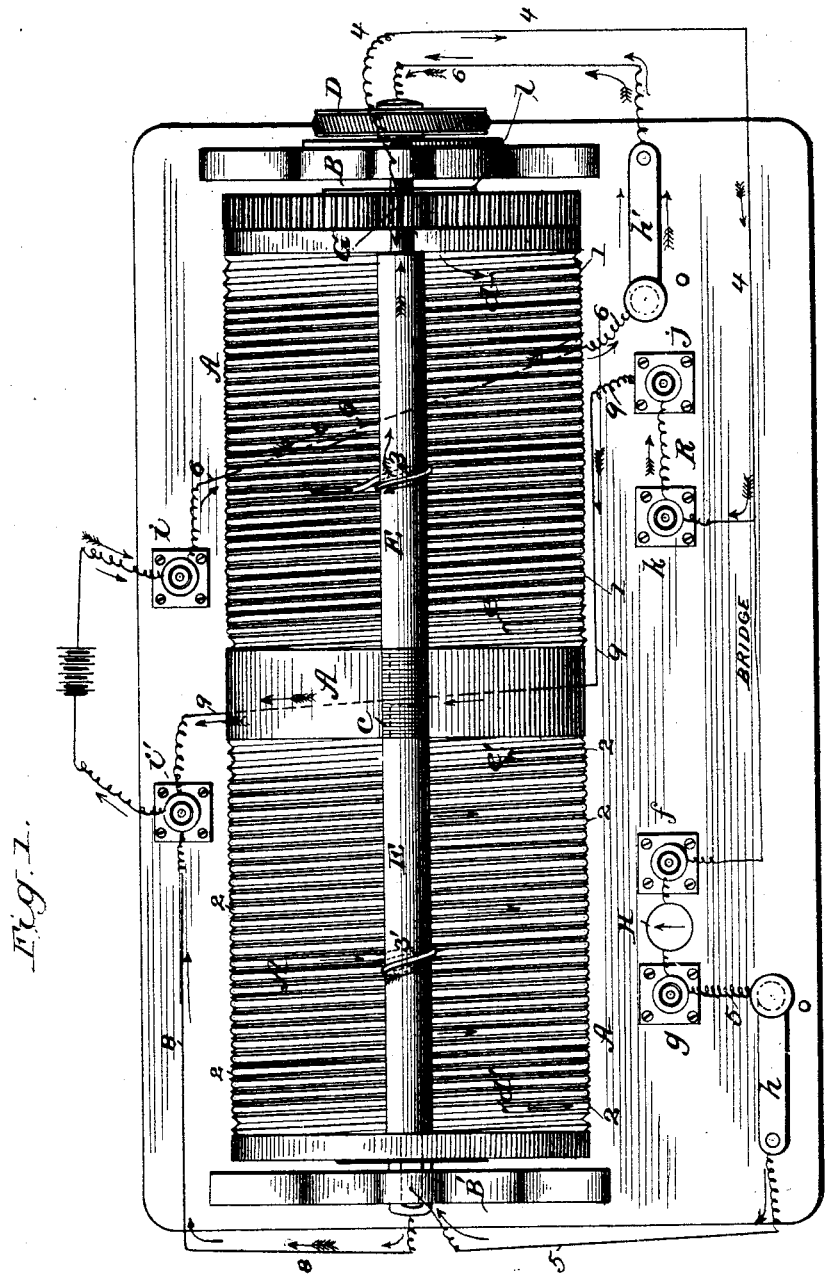
WITNESSES:
Fred G. Dieterich
Amos W. Hart
INVENTOR
George B. Lawrason
BY
Munn & Co.
ATTORNEYS.

(No Model.) 2 Sheets—Sheet 2.
G. B. LAWRASON.
INSTRUMENT FOR MEASURING AND REGULATING ELECTRICAL RESISTANCES.
No. 514,325. Patented Feb. 6, 1894.
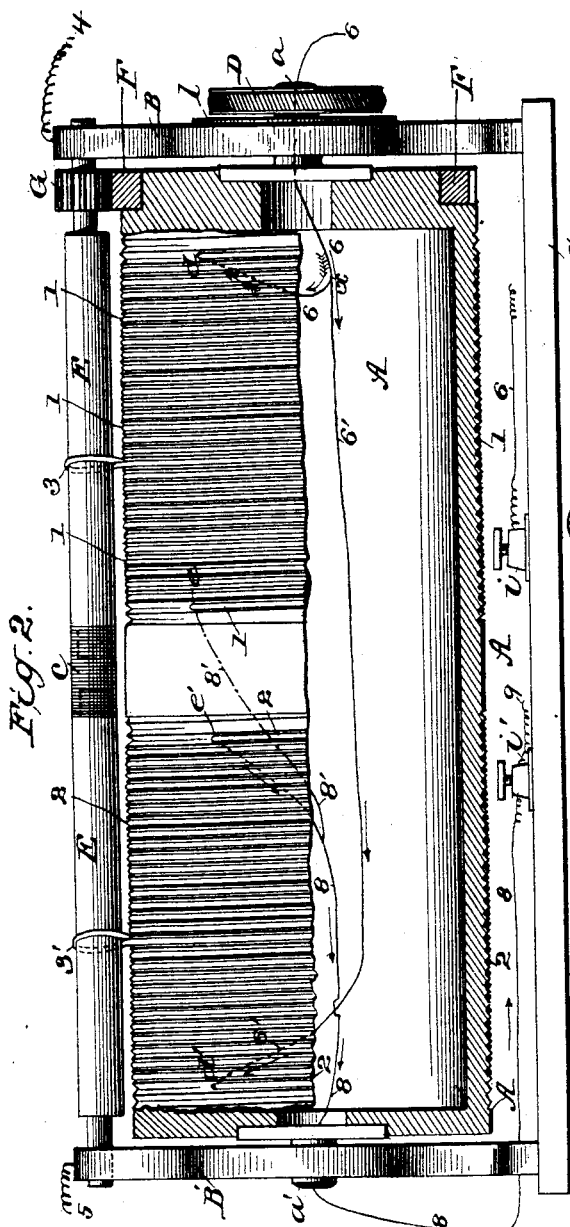
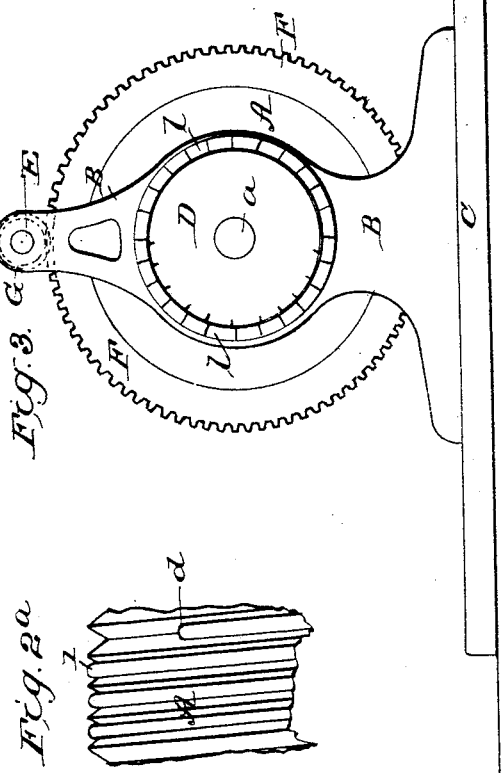
WITNESSES:
Fred G. Dieterich
Amos W. Hart
INVENTOR
George B. Lawrason
BY Munn & Co
ATTORNEYS.

UNITED STATES PATENT OFFICE.

GEORGE B. LAWRASON, OF NEW ORLEANS, LOUISIANA.

INSTRUMENT FOR MEASURING AND REGULATING ELECTRICAL RESISTANCES.

SPECIFICATION forming part of Letters Patent No. 514,325, dated February 6, 1894.

Application filed June 13, 1893. Serial No. 477,428. (No model.)

*To all whom it may concern:*

Be it known that I, GEORGE B. LAWRASON, residing at New Orleans, in Orleans parish and State of Louisiana, have invented a new and useful Improvement in Instruments for Measuring and Regulating Electrical Resistances, of which the following is a specification.

My invention involves the principle of the well known Wheatstone bridge. It is in fact an improved form of the latter, with new or added parts, whereby greater range and accuracy in the measurement of resistances are attained, and whereby the instrument is also adapted for use as a rheostat proper, that is to say for merely regulating or adjusting a circuit so that any required degree of electromotive force may be maintained.

The main features of the invention are (first) a rotatable non-conducting cylinder, having exteriorly two spiral grooves in which the conductors are wound whose adjustment shortens or lengthens the distances between the point bridged from the main circuit; (second) a conducting rod composed of two aligned but insulated parts, and arranged parallel with the said cylinder as well as adapted to rotate. The conductors, or circuit wires, wound in the respective spiral grooves of the cylinder, are also looped around the aforesaid rod, so that the current is not only divided and caused to take two paths through the instrument, but the resistance may be adjusted or varied at will by rotating the cylinder, which changes the position of the loops around the conducting rod, and thus practically lengthens or shortens the conducting or circuit wires, correspondingly, and varies the several resistances provided by the connection and arrangement of conductors with the cylinder and rod.

The details of construction, arrangement, and operation of the instrument are as hereinafter described, reference being had to accompanying drawings, in which—

Figure 1 is a plan view of the instrument. Fig. 2 is a central vertical section; and Fig. 2ᵃ shows a portion of the cylinder enlarged. Fig. 3 is an end view, minus the conductors, or circuit wires.

The elongated hollow cylinder, A, is of some suitable non-conducting material, and supported, horizontally, by journals $a$, $a'$, which rotate in bearings in parallel uprights, B, B', fixed in a bed-piece, C. A milled hub, or disk, D, is fixed on the journal, $a$, for use in rotating the cylinder to vary the resistance of the circuit, as hereinafter described. The cylinder is grooved spirally, from right to left, a blank or ungrooved space being left in the middle between the two sets of grooves thus formed. A metal, conducting rod, E, is arranged directly over the cylinder, A, parallel thereto, and journaled in the uprights, B, B'. This rod is divided transversely, thus forming virtually two aligned conductors which are insulated from each other by a non-conducting, union or joint-piece, $c$. A gear, F, is fixed on one end of the cylinder A, and a meshing pinion G, on the rod E, the same (F G) being so proportioned that the rod will rotate at the same surface speed as the cylinder. A bare copper resistance wire 1, is wound in the right hand groove of the cylinder A, and a similar wire 2, in the other groove. The terminals of the wires 1 and 2 pass (Fig. 2) through holes at $d$ $e$, and $d'$ and $e'$, respectively, in the periphery of the cylinder, being joined to other conductors as hereinafter stated. The wires 1 and 2 are each looped around the rod E, as shown, the respective loops 3, 3' being at and always preserving the same distance from the beginning, or right-hand extremities of the conductors 1, 2. Each half of the rod E is connected (Fig. 2) by means of wires 4 and 5 with a sensitive galvanometer H, which is arranged between two binding posts $f$ $g$, and thus forms the "bridge." A suitable switch, or contact key $h$, is placed in this circuit, as shown.

The arrangement of the battery circuit is as follows—the wire 6, from the positive element of the battery, passes to a binding post $i$, thence to a contact key $h'$ through the right hand journal $a$, of the cylinder A, into the interior of the latter, where it connects at $d$, with the beginning, or outer end, of the wire 1, wound in the right hand groove. A branch 6', of this same wire 6, leads through the cylinder (Fig. 2) to the outer end, of the wire 2, which is wound in the left hand groove.

When the instrument is to be used as a rheostat proper, and only then, the terminal $e$ of the cylinder wires 1, is connected (Fig. 2) by a wire 8', with wire 8 leading to the negative pole of the battery, the said wire 8 passing for this purpose through the left hand journal $a'$, of the cylinder A. Another wire 9, (Fig. 1) leads from the binding post, $i'$ (which is connected with the negative wire of the battery) to one ($j$) of two binding posts, $j$ and $k$, which are connected by the resistance R, to be measured. This post $k$ is in circuit with the respective ends of the metal conducting rod E. In consequence of this arrangement of circuits, the electrical current takes two paths in passing through the instrument—as indicated by arrows and darts, respectively first, the current passes by wire 6, to the wire 1, in the right hand cylinder groove, and through its loop 3, to the right hand half of the metal rod E, thence to wire 4, to the left hand resistance binding-post $k$, then traverses the wire R, to be measured, thence from binding post $j$, through the negative wire 9 to the negative binding post $i$. The other track of the current (see darts) branches at $x$, (Fig. 2) from wire 6, inside the cylinder, and follows wire 6', to the beginning $d'$, of the left-hand cylinder wire 2, traverses the loop 3', thence (if there is no current across the bridge wire) to the end of this wire at $e'$, then by wire 8, to the negative binding post $i'$.

To measure the resistance of a wire, its ends are connected with the binding posts $jk$. Then the cylinder A, is rotated until a point is reached when no deflection of the galvanometer H, can be detected; or, in other words, when no current flows from one loop 3, to the other, 3', through the galvanometer. The resistance of each turn of convolutions of the winding wires 1, 2, of the cylinder A, being known, it follows that the number of such turns will furnish the data required for calculating the resistance to be measured.

The following is a formula for calculation. R equals resistance of wire to be measured. $x+y$ equals total number of turns of each wire. $x$ equals number of turns on the right of loops over conducting-rod, E. $y$ equals number of turns on the left of said loop. $a$ equals resistance of one turn of right hand wire, $a(x+y)$ being the whole resistance of this wire. $b$ equals resistance of one turn of left hand wire. When cylinder, A, is rotated until there is no current crossing the "bridge," we have the proportion—

$$\frac{R}{bx} = \frac{ax}{by} \text{ or } R = \frac{ax^2}{y}$$

Thus it is immaterial what the resistance of left hand wire may be, provided it be uniform. If we make $a$ equal one ohm, or .1 ohm or .01 ohm then let $x+y$ equal one hundred, $x$ equal eight, $y$ equal ninety-two, $a$ equal one ohm. Then to find R—

$$R = \frac{x^2}{y} \text{ or } 10R = \frac{x^2}{y}, \&c. \text{ or } R = .69565 \text{ ohm.}$$

A mechanical indicator of the number of turns of the cylinder A, is afforded by the position of the loops 3, 3', or their distance from the ends of the cylinder A; but a preferred and more accurate means for this purpose consists of the graduated disk $l$ (Fig. 3,) which is fixed on the right hand journal $a$, of the cylinder A, and whose edge is contiguous to a larger graduated ring $m$, inscribed on the upright B. By observation of this indicator the number of revolutions of the cylinder and hence the number of turns or fractions of a turn of the wires around it can be readily ascertained. The accuracy, or range of measurement can be increased at will by interposing a known resistance at either end of the left-hand cylinder wire. Thus, if one turn of said wire equals .01 ohm and the resistance added ten ohms, this will be equivalent to adding one thousand turns of wire. The wire 8, shown in Fig. 2, as connecting the negative end of wire 1 with wire 8 (which leads to the negative winding post) is thus applied as before intimated, only when the instrument is used as a rheostat, at which time the binding posts $j$ and $k$ are disconnected, so that R can never be in a short circuit.

(It will be understood, that all the connecting wires are made of such diameter that their resistance may be neglected in the estimate, or computation.) It will thus be seen that the rotation of the cylinder varies every resistance, except the one to be measured; or, in other words, all three known resistances vary simultaneously, thereby insuring the attainment of greater accuracy of measurement than is practicable with ordinary forms of "Wheatstone bridges." And this result is accomplished by comparatively simple means whose use or manipulation involves no difficulty.

It is obvious the instrument may be used for indicating voltage.

When the instrument is manufactured for use only as a rheostat, the binding posts $j$ and $k$ are dispensed with, and the posts $g$ and $f$ placed in the middle, for use in attaching electrodes through which electricity is to be applied, say for medical purposes, an ordinary milliampère meter being placed at any convenient point in the same circuit which connects each side of the metallic rod E. It is evident that when the proportion between the divisions of wires 1 and 2 on each side of loops is satisfied, no current will pass through the galvanometer, or the path connecting binding posts; and, as we destroy this proportion, by turning very slowly in one direction or the other, a current will gradually flow in a direction corresponding to the direction of the turn.

Having thus described my invention, what I claim is—

1. In an electrical instrument of the character specified, the combination, with the conductor rod, made in two insulated and aligned parts, the parallel, hollow cylinder having two separate sets of circumferential, spiral grooves which run from right to left in the same, two conductors 1 and 2, which are wound in the respective grooves, and looped over the said rod, and pass into said cylinder, the circuit wires which connect with the terminals of said conductors, and the galvanometer binding-posts, and gearing for operatively connecting the rod and cylinder, substantially as shown and described.

2. In an electrical instrument, the combination, with the conductor rod and hollow cylinder geared together, the cylinder having two sets of spiral grooves running in the same direction, two conductors wound in such grooves, looped over the rod, and entering the cylinder, the circuit wires 4, 5, 6, 7, 8, 8', 9 and "bridge," galvanometer binding-posts and resistance posts, all arranged substantially as shown and described.

3. In an electrical instrument of the character specified, the combination, with the spirally-grooved rotatable cylinder, and a conducting rod arranged parallel thereto, of one or more conductors wound in the grooves of such cylinder and looped over the said rod, and suitable connections by which such conductor or conductors are put in circuit with a battery or other source of electrical supply, substantially as shown and described.

GEORGE B. LAWRASON.

Witnesses:
JAMES WILKINSON,
WM. WINANS WALL.